(12) United States Patent
Kim

(10) Patent No.: US 7,948,649 B2
(45) Date of Patent: May 24, 2011

(54) IMAGE-FORMING APPARATUS AND EXECUTED-JOB-STORING METHOD THEREOF

(75) Inventor: Ki-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1115 days.

(21) Appl. No.: 11/404,805

(22) Filed: Apr. 17, 2006

(65) Prior Publication Data

US 2006/0262351 A1 Nov. 23, 2006

(30) Foreign Application Priority Data

May 21, 2005 (KR) .................. 10-2005-0042791

(51) Int. Cl.
*G06F 15/00* (2006.01)
*G03G 15/20* (2006.01)
(52) U.S. Cl. ........................................ 358/1.16; 399/70
(58) Field of Classification Search .................. 358/1.16, 358/1.15, 1.13, 1.14, 1.18, 474, 523, 524, 358/402, 296, 401, 906, 1.9; 235/454, 492; 399/70, 82, 85, 83, 366; 382/299, 139; 709/203, 709/205, 227
See application file for complete search history.

(56) References Cited

U.S. PATENT DOCUMENTS

| 5,016,114 | A | 5/1991 | Sakata et al. | |
|---|---|---|---|---|
| 5,481,303 | A | 1/1996 | Uehara et al. | |
| 6,304,336 | B1 * | 10/2001 | Sugaya | .................. 358/1.16 |
| 7,599,100 | B2 * | 10/2009 | Higuchi et al. | .............. 358/403 |
| 2001/0000969 | A1 | 5/2001 | Ohta et al. | |
| 2003/0030831 | A1 | 2/2003 | Murata | |
| 2004/0125218 | A1 | 7/2004 | Ohmori | |

FOREIGN PATENT DOCUMENTS

| EP | 1 158 764 A2 | 11/2001 |
|---|---|---|
| JP | 11-353471 | 12/1999 |
| JP | 2000-13577 | 1/2000 |
| JP | 2003-256152 | 9/2003 |
| KR | 1020030055823 | 7/2003 |

OTHER PUBLICATIONS

European Search Report dated Sep. 28, 2006 issued in EP 6113525.7.
Korean Office Action dated Jul. 24, 2006 issued in KR 2005-42791.

* cited by examiner

*Primary Examiner* — Saeid Ebrahimi Dehkordy
(74) *Attorney, Agent, or Firm* — Stanzione & Kim, LLP

(57) ABSTRACT

An image-forming apparatus connectable to an external memory and an executed job-storing method thereof, which checks a stored data size of a job and an available memory size of the external memory, and proposes alternative options if the available memory size is insufficient, enabling a user to rapidly execute the job suitable for the user's purpose without any need to secure more memory space.

19 Claims, 3 Drawing Sheets

FIG. 3

| | File Format | DOCUMENT KIND | Color/Mono | RESOLUTION | NUMBER OF SHEETS | REQUIRED MEMORY | AVAILABLE MEMORY |
|---|---|---|---|---|---|---|---|
| Current Job | JPEG | TEXT | Color | 300dpi | 4 | 12M | 11M |
| 1st option | JPEG | TEXT | Mono | 300dpi | 4 | 68K | 11M |
| 2nd option | JPEG | TEXT | Color | 200dpi | 4 | 8M | 11M |
| 3rd option | JPEG | TEXT | Color | 200dpi / 300dpi | 2 / 2 | 10M | 11M |
| Nth option | - | - | - | - | - | - | - |

IMAGE-FORMING APPARATUS AND EXECUTED-JOB-STORING METHOD THEREOF

CROSS-REFERENCE TO RELATED APPLICATIONS

This application claims priority under 35 U.S.C. §119 of Korean Patent Application No. 2005-42791 filed on May 21, 2005, in the Korean Intellectual Property Office, the entire contents of which are hereby incorporated by reference.

BACKGROUND OF THE INVENTION

1. Field of the Invention

The present general inventive concept relates to an image-forming device, and more particularly, to a device and method to efficiently store data in an external memory.

2. Description of the Related Art

Portable data storage devices (hereinafter, referred to as external memories) include magnetic discs or CD-ROMs, Universal Serial Bus (USB) discs, and the like.

Since more problems such as bottlenecking are caused on computer interfaces as multimedia functions are becoming in more demand on computer systems, more attention is drawn to the use of the USB discs.

Such USB discs are manufactured as interfaces for solving low transmission rates of existing external extension ports (Serial, Parallel), which are serial ports that cause inconvenience to a user due to limited numbers of connections for peripherals.

Compared to the external extension ports used for connecting peripherals (such as modems, printers, scanners, and the like), the USB discs have an advantage in that the USB discs are capable of connecting all basic peripherals (such as a keyboard, monitor, mouse, printer, modem, and the like), which must be connected in different modes when using the external extension ports. Further, when new peripherals are plugged into a computer, the USB disc automatically recognizes the new plugged-in peripherals, allows 127 peripherals to be connected at maximum with automatic recognitions rather than a rebooting or a setup process, and uses a voltage of 5V with a data transmission rate of 12 Mbps at maximum. The USB disc can be easily installed with its full PnP mode supports, and does not need extra peripherals since most mainboard chipsets contain a USB controller. Recently-manufactured mainboards include a USB chipset and terminals so the USB-related peripherals can be more conveniently used.

The USB disc is equipped with a flash memory unit therein so that users can store data files, voice files, audio files, compressed video files, and the like, in real time, for which a Scan2USB function has been introduced.

The Scan2USB function refers to a function enabling scanned images from a digital photocopier or an image-forming apparatus having a scanner to be stored in a USB memory directly connected thereto (i.e., without a connected personal computer). Therefore, users can exert less effort with a personal computer to scan and store images or documents into the USB memory.

However, the USB memory has limitations due to characteristics of storage media since the USB memory is also a piece of the storage media. Conventionally, if a user sends a job instruction for the Scan2USB function, data is stored in the USB memory. However, if the USB memory indicates that it is full, a problem occurs in that the ongoing job is terminated.

That is, even though the user checks the USB memory status in advance and determines that a memory size is sufficient so as not to interrupt a storing job due to a lack of memory, and then performs the Scan2USB function, the ongoing job may still be terminated if the memory indicates that it is full when the memory size is substantially smaller than the user has judged. Thus, the user has to secure more memory to make up for the insufficient memory size, and then have the job performed. In other words, the user has to check the memory size and judge whether the current job can be performed before carrying out the job. However, the user has to secure the memory size based on the user's subjective judgment since there is no objective data about how much memory scanned files take up, which causes the above problem.

SUMMARY OF THE INVENTION

The present general inventive concept solves at least the above drawbacks, and other problems, associated with conventional image forming apparatuses. The present general inventive concept provides a device and method that continues to performs a current job by calculating a memory size expected for the current job and proposing alternative options if an available memory size is insufficient.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image-forming apparatus to connect to an external memory, the image-forming apparatus including a control unit to compare a data size of a job to an available memory size of the external memory and to determine whether the job can be stored in the external memory based on the comparison.

The control unit may include calculates a data size of the job, compares the data size to the available memory size of the external memory, and executes the job if the available memory size is larger than the data size.

The control unit may propose at least one alternative job option having an alternate data size that is smaller than the available memory size of the external memory.

The image-forming apparatus may include a memory unit to store the data size of the job, the control unit may calculate the data size of the job using a stored data size corresponding to the job and stored in the memory unit, and may execute the job if the available memory size of the external memory is larger than the stored data size of the job.

The control unit may propose at least one alternative job option having an alternate data size that is smaller than the available memory size of the external memory.

The memory unit may store the data size in a database. The database may include data regarding at least one of resolution, color mode, and document type.

The external memory may be a USB memory or a memory card. The job may be a job to copy data, a job to move data, or a job to scan data stored in the image-forming apparatus to the external memory.

The foregoing and/or other aspects and utilities of the present general inventive concept may be achieved by providing a method of storing jobs in an external memory that is connectable to an image-forming apparatus, the method including checking a stored data size of a job stored in the image-forming apparatus, checking an available memory size of the external memory; comparing the stored data size to the available memory size, and determining whether the job can be stored in the external memory.

The determining whether the job can be stored in the external memory comprises determining whether the available memory size of the external memory is larger than the stored data size of the job. The further comprising proposing at least one alternative job option having an alternate data size that is smaller than the available memory size of the external memory.

The external memory may be an USB memory or a memory card. The stored data size may be stored in the image-forming apparatus as a look-up table including a plurality of data sizes corresponding to a plurality jobs having various combinations of resolution, color mode, and document kind values.

The checking the stored data size comprises determining an expected memory size of the job using the look-up table.

The job is a job to copy data, a job to move data, or a job to scan data stored in the image-forming apparatus to the external memory.

The foregoing and/or other aspects and utilities of the present general inventive concept may also be achieved by providing a method of storing an image forming apparatus job in an external memory, the job having a combination of job options, the method including calculating a size of available memory of the external memory, determining an expected size of the job using a look-up table including data sizes of a plurality of different combinations of job options, comparing the size of the available memory and the expected size of the job, when the expected size of the job is less than the size of the available memory, performing the job and updating the look-up table with an actual size of the job, and when the expected size of the job is greater than the size of the available memory, proposing alternative image forming apparatus jobs each having a size less than the size of the available memory.

The method may further include proposing the alternative jobs, selecting one of the alternative jobs, performing the selected alternative job, and updating the look-up table with an actual size of the selected alternative job. The method may further include canceling the job, and storing a part of the job in the external memory.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 is a view illustrating a list of alternative options according to an embodiment of the present general inventive concept.

DETAILED DESCRIPTION OF THE PREFERRED EMBODIMENTS

Figure 1:
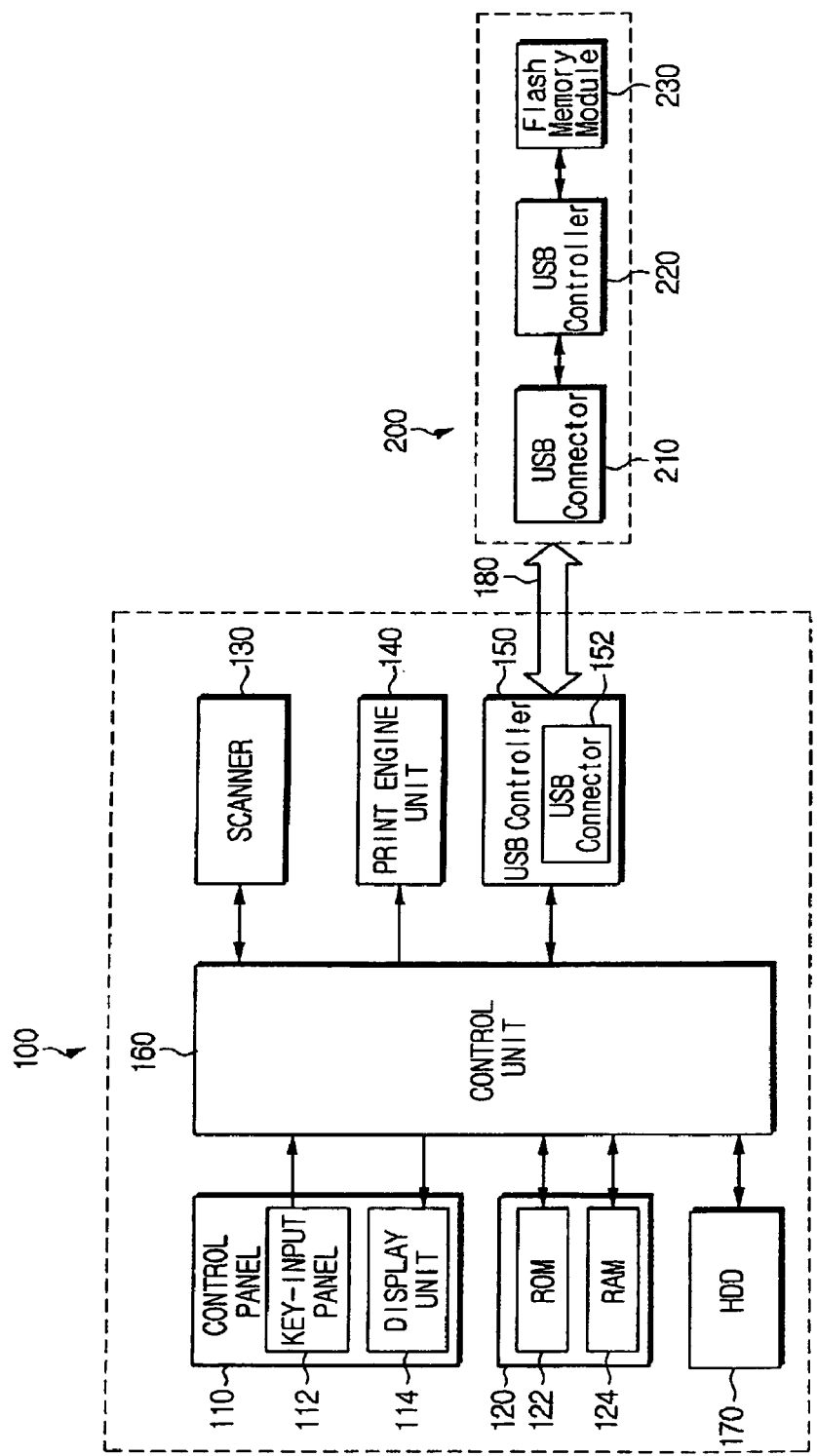
FIG. 1 is a block diagram schematically illustrating an image-forming apparatus connectable to an external memory according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram schematically illustrating an image-forming apparatus 100 that can be connected to an external memory 200 according to an embodiment of the present general inventive concept. The external memory 200 and the image-forming apparatus 100 may operate in a host platform and may be connected to each other through a cable 180.

As illustrated in FIG. 1, the external memory 200 may be a USB memory including a memory card, and the cable 180 may be a USB cable. Furthermore, jobs to be executed by the image forming apparatus 100 include, but are not limited to, copying, moving, and scanning files or data to a different storage medium (e.g., scan2USB functions).

The image-forming apparatus 100 may include a control panel 110, a memory unit 120, a scanner 130 to scan a document (hereinafter, referred to as a target document), a print engine unit 140 to print the target document, a USB controller 150, a control unit 160, and a HDD (hard disc drive) 170.

The control panel 110 may include a key-input panel 112 having selection keys (not illustrated) to enable a user to select options necessary for a job (e.g., a scan2USB function), and a display unit 114 to display an operating status of the image forming apparatus and to display user interfaces (UIs).

The memory unit 120 may include a ROM 122 and a RAM 124. The ROM 122 is a non-volatile memory device to store various control programs required to execute various functions supported in the image-forming apparatus 100, firmware to convert scanned data obtained from the scanner 130, data transfer protocols, a look-up table, UIs (such as option selection windows necessary for scan jobs), a list of alternative options according to the present general inventive concept, and the like.

The look-up table is a table to store and manage data sizes. For example, the look-up table may store data sizes by resolution and by file format. Further, the control unit 160 may update the look-up table every time a certain job is terminated due to a lack of available memory. The look-up table may store memory size values larger than average since memory sizes of different target documents can vary.

For reference, Table 1 illustrates a look-up table listing options for data sizes for color and mono JPEG file formats, per sheet, by document size and by resolution.

TABLE 1

| | Color/Mono | | | |
|---|---|---|---|---|
| | Color | | Mono | |
| | Paper size | | | |
| Resolutions | A4 TEXT | A4 PHOTO | A4 TEXT | A4 PHOTO |
| 100 dpi | 1M | 2M | 10K | 11K |
| 200 dpi | 2M | 3M | 12K | 13K |
| 300 dpi | 3M | 4M | 17K | 18K |
| 400 dpi | 4M | 5M | 19K | 20K |
| 500 dpi | 4.5M | 6M | 21K | 22K |
| 600 dpi | 5M | 7M | 25K | 27K |
| 1200 dpi | 7M | 8M | 40K | 45K |

Thus, if a job is executed according to options that a user has selected (hereinafter, referred to as an executed job), the user can determine an expected memory size with reference to the look-up table, such as the look-up table of Table 1.

The RAM 124 temporarily stores scan data obtained from the scanner 130, data externally-received, and the like.

The scanner 130 scans a target document according to user-selected resolution and file format options, obtains image data, and temporarily stores the image data in the RAM 124 or prints the image data using the print engine unit 140.

The print engine unit 140 prints target data under the control of the control unit 160.

The USB controller 150 may control and manage USB transmissions and receptions on a USB bus, may be connected to the cable 180 (e.g., a USB cable) through a USB connector 152, and may operate the external memory device 200, which is a nonvolatile storage device (e.g., a USB memory device), under the control of the control unit 160.

The HDD 170 may be a recording medium to store data received from the external memory 200 and data created in the image forming apparatus 1.

The control unit 160 controls operations of the image-forming apparatus 100 according to control programs stored in the ROM 122. According to an embodiment of the present general inventive concept, if a user selects the scan2USB function on the key-input panel 112, the control unit 160 reads a UI stored in the ROM 122 and enables the user to select options such as resolution, color or mono, and the like, and displays an available memory size of the external memory 200.

The control unit 160 may analyze the content of a job to be executed according to the selected options as described above, and may predict a memory size required to store the job with reference to a look-up table, such as the look-up Table 1, stored in the ROM 122. Further, if the available memory size of the external memory 200 is insufficient based on a comparison of the available memory size to the expected memory size, the control unit 160 can change the options that the user has selected so that the job requires less memory, so that the changed options are suitable for the available memory size. That is, the control unit 160 controls the scanner 130 to scan a document according to the changed options (hereinafter, referred to as a list of alternative options), and stores the scanned images into the external memory 200.

Further, the control unit 160 compares a memory size for files, data, and the like to an available memory size of the external memory 200 so that a user can easily check whether to execute the job, even when the user copies or moves the files, data, and the like stored in the HDD 170 or the memory unit 120 to the external memory 200.

As discussed above, the external memory 200 may be a USB memory, and may include a USB connector 210, a USB controller 220, and a flash memory module 230. The USB memory 200 may be connected to the image-forming apparatus 100 and to the USB cable 180 through the USB connector 210, which is a connector to mount the USB memory 200 to the image forming apparatus 100.

The USB controller 220 receives and sends data from and to the image-forming apparatus 100 through the USB connector 210, and performs diverse operations (such as data read, write, delete, and the like) from or to the flash memory module 230.

The flash memory module 230 may include modules of non-volatile memories each including NAND flash cells or NOR flash cells, in which data can be stored.

Further, if a signal requesting an available memory size is received by the USB memory 200 from the control unit 160, the USB controller 220 compares and calculates a memory size of the flash memory module 230, and sends the available memory size of the flash memory module 230 to the control unit 160.

In addition to sending the available memory size to the control unit 160, the USB controller 220 can send additional information, including, but not limited to, data storage time, data kind, and the like, so that a user can change options to require less memory, and/or can delete data stored in the USB memory 200 to increase an amount of memory available in the USB memory 200.

Figure 2:
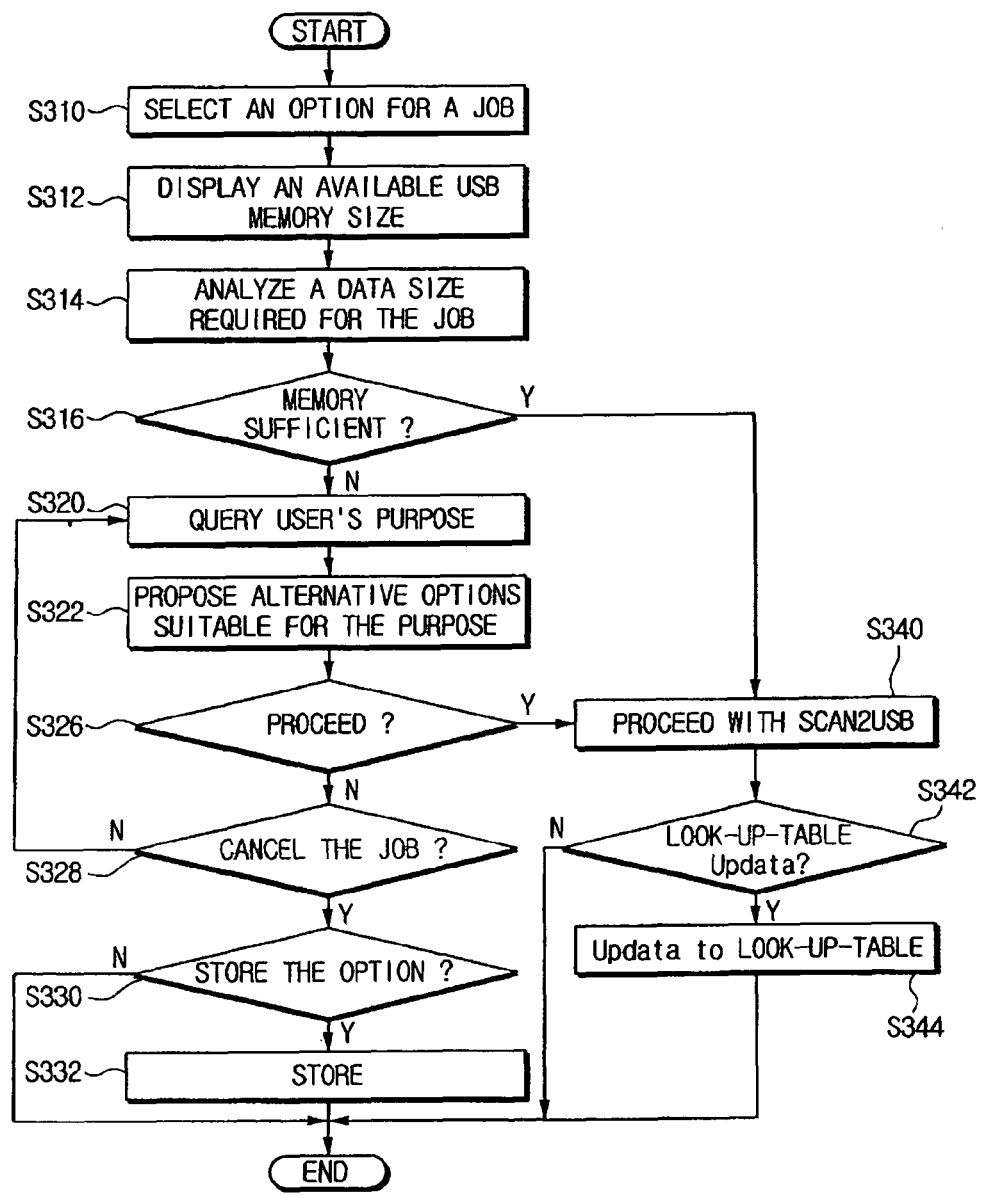
FIG. 2 is a flow chart illustrating an executed-job-storing method for an apparatus according to an embodiment of the present general inventive concept.

Hereinafter, description will be made with reference to FIGS. 1 and 2, of an executed-job-storing method useable in an image-forming device that can be connected to an external memory, according to an embodiment of the present general inventive concept.

A scan2USB function may be selected by a user on the key-input panel 112 when the USB memory 200 is connected to the image-forming apparatus 100 through the USB cable 180. The control unit 160 reads and displays a UI stored in the ROM 122 on the display unit 114 so that the user can select options at operation S310, such as resolution, color mode, and the like, necessary for a scan job.

Thus, when the user selects options for a job at operation S310, the control unit 160 requests the USB memory unit 200 to provide an indication of an available memory size of the flash memory module 230, and may display the available memory size on the display unit 114 at operation S312.

The control unit 160 also analyzes the user-selected options, and calculates an expected memory size necessary for the job to be executed by referencing a look-up table (such as Table 1) in operation S314.

If the options selected by the user at operation S310 are, for example, A4-size paper, text, 300 dpi color, and JPEG, for a scan2USB job, a 3 Mbytes of memory is needed according to the look-up table of Table 1, which is stored in the ROM 122.

At operation S316, the required memory size calculated at operation S314 and the available memory size of the USB memory unit 200 provided by the USB memory 200 at operation S312 are compared to determine whether the USB memory 200 has sufficient memory available for the requested job.

If the available memory size of the USB memory unit 200 is determined to be greater than the expected memory size of the job at operation S316, the control unit 160 proceeds with the scan2USB job at operation S340. The job may be terminated due to an insufficient available memory size of the USB memory 200 because the expected memory size of the job is smaller than an actual memory size of the job. The control unit 160 may then update corresponding data in the look-up table with the actual memory size of the job at operation S342.

For example, if a current job in 300 dpi, Color mode, and JPEG ends up with an actual memory size of 4 Mbytes, but the look-up table lists the expected memory size for that the job in 300 dpi, Color mode, and JPEG as 3 Mbytes, the control unit 160 may update the look-up table by replacing the listed 3 Mbytes for the job with a listing of 4 Mbytes for the job. Thus, after the look-up table in the ROM 200 is updated, the control unit 160 will calculate the expected memory size of a job in 300 dpi, Color mode, and JPEG as requiring 4 Mbytes of memory (as opposed to the previous expected memory size of 3 Mbytes for the same job). However, the control unit 160 does not update the look-up table when the actual memory size is smaller than the corresponding expected memory size listed in the look-up table. Thus, the updated data is used for future memory size comparisons. The updates are done since memory sizes vary depending on image complicatedness, such as text files vs. image-mixed text files.

If it is decided that an update is needed at operation S342, the control unit 160 changes the corresponding data in the look-up table and terminates the method at operation S344.

Meanwhile, if it is determined that the available memory size is insufficient at operation S316, the control unit 160 first queries the user's purpose for the print job through the display unit 114 in order to look for alternative options that would enable the job to be executed at operation S320. For example, the user's purpose may be a scan2USB job that includes one or more of the following options listed in Table 1: Mono print, Color print, Transfer to PC.

If the purpose selected by the user is checked at operation S320, the control unit 160 proposes alternative options corresponding to the available memory size while satisfying the user's purpose at operation S322.

For example, the control unit 160 may propose that the user change a resolution, a Color mode, and a data size, with reference to Table 1. The proposed plural alternative options of the control unit 160 enables the user to successfully execute the job with the USB memory unit 200.

Hereinafter, description will be made of a method of proposing alternative options with reference to FIGS. 2 and 3. FIG. 3 is a view illustrating a list of alternative options 400 that the control unit 160 may propose with reference to Table 1, when four sheets of a text document in 300 dpi, Color mode, and JPEG are set as a job (as a current job) to be executed and an available memory size in the USB memory 200 (see FIG. 1) is less than the expected memory size of the current job determined using the look-up table of Table 1.

In FIG. 3, the list of alternative options 400 may include an option description part 410 to list in a row the options that a user can select, a user-selected option value description part 420 to describe current option values specified by the user for each of the user's option selections, and a required memory size description part 450 to describe memory amounts necessary for the selected options with reference to Table 1.

The option description part 410 may list in order the options stored in the look-up table of Table 1. In addition, the option description part 410 may list available memory sizes displayed by the control part 160 (see FIG. 1) at operation S312.

Further, an alternative option description part 430 may list in order the options that the control unit 160 has proposed, and may list option values and required memory sizes for the alternative options.

In FIG. 3, the current job requires a memory size of about 12 Mbytes for its execution. If the USB memory unit 200 has an available memory size of 11 Mbytes, as illustrated in FIG. 3, the memory size is 1 Mbyte short for the job. In such circumstances, the control unit 160 may first ask the user for the user's purpose of scanning four sheets in order to secure the memory size of 1 Mbyte at operation S322. For example, if the user selects the option of Mono print as the user's purpose, the control unit 160 can propose that the user use Mono in 300 dpi or Mono in 600 dpi as the first alternative option, since the option Mono alone does not exceed the memory size of 11 Mbytes at any resolution when one sheet of a document is stored.

Further, in the same circumstances, if the user has to store four sheets of the document in color, the memory size is insufficient for all the four sheets to be scanned in 300 dip color, so the control unit 160 can propose options requiring less memory size than the available memory size. For example, the control unit 160 may propose a second alternative option of Color 200 dpi, which requires a memory size of about 9 M, or a third alternative option of 2 sheets in 200 dpi and the other 2 sheets in 300 dpi, which requires a memory size of about 10 M, as illustrated in FIG. 3.

Thus, the control unit 160 displays alternative options that would enable the job to be successfully executed in view of the available memory size in the external memory 200.

The control unit 160 may then determine whether to proceed with the job based on an alternative option selected by the user out of the above proposed alternative options at operation S326.

The control unit 160 may cancel the job if any of the proposed alternative options is not accepted by the user at operation S328. The control unit 160 may then look for different alternative options that may be acceptable to the user, repeating operations S320-S326.

Alternatively, the control unit 160 may, if any proposed alternative option is selected by the user at operation S326, proceed with the scan2USB job at operation S340.

At operation S330, the control unit 160 asks the user whether to store the option selected at operation S310 when the user cancels the alternative options proposed at operation S328. If the user chooses to store the option, the control unit 160 enables the user to reserve the available memory size in the USB memory unit 200 at operation S332, which can be used when the job resumes.

The alternative options proposed by the control unit 160, as illustrated in FIG. 3, are formed so that the user may change initially-selected option values based on an available memory size in the external memory 200 and the expected memory size of the job determined using a look-up table (such as the look-up table of Table 1). The alternative options allow the user to change the actual memory size of the job, while directly checking the change in the actual memory size. The changes in actual memory size can be displayed with a changed option value in the required memory size description part 450 of the list of available options 400. For example, in FIG. 3, if the user selects the first option (i.e., selects the Mono option as opposed to the Color option selected for the current job), the user can set a higher resolution since the required memory size for the selected first option is only about 68 Kbytes compared to the available memory size of 11 Mbytes. In other words, by selecting the first option in FIG. 3, the user decreases the expected memory size of the job from about 12 Mbytes to less than 1 Mbyte, which leaves about 10 Mbytes of available memory in the external memory 200.

As described above, the control unit 160 may propose plural alternative options to the current job, as illustrated in FIG. 3. The control unit 160 may also propose the plural alternatives in a specific format. For example, the control unit 160 may list the alternative option most suitable for the user's purpose first as the first option. The user may then decide whether to proceed with the first proposed alternative option, or whether to proceed with one of the other alternative options displayed in an order of more suitability to less suitability.

In various embodiments, an image-forming apparatus can notify a user of a result of a comparison of a file or a data memory size (in addition to a memory size for a scan2USB function) to an available memory size of an external memory so that the user can easily execute a selected job even when the image-forming apparatus copies or moves the file or data.

When a user selects a job to be executed, an option proposal device and method according to various embodiments of the present general inventive concept may provide the user with information on an available memory size of an external memory and an expected memory size of the job to be executed when the current job is completely executed. If the current job expected memory size exceeds the available memory size of the external memory, the image forming apparatus can propose to the user alternative options to enable the job to be executed so that the user can proceed with the job according to the user's purpose without job termination due to an external memory having insufficient memory space during the processing and without any further effort to secure a job having an actual memory size that is smaller than the available memory size of the external memory.

Although various embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image-forming apparatus to connect to an external memory, the image-forming apparatus comprising:
   a memory to store a job;
   a network interface to communicate with the external memory; and
   a control unit to compare a data size of the job to an available memory size of the external memory with reference to a look-up table and to determine whether the job can be stored in the external memory based on the comparison,
   wherein the look-up table includes a plurality of data sizes corresponding to a plurality jobs having various combinations of resolution, color mode, and document kind values.

2. The image-forming apparatus as claimed in claim 1, wherein the control unit calculates a data size of the job, compares the data size to the available memory size of the external memory, and executes the job if the available memory size is larger than the data size.

3. The image-forming apparatus as claimed in claim 1, wherein the control unit proposes at least one alternative job option having an alternate data size that is smaller than the available memory size of the external memory.

4. The image-forming apparatus as claimed in claim 3, wherein each of the proposed alternative options are displayed with corresponding option values by the control unit.

5. The image-forming apparatus as claimed in claim 1, wherein the memory unit to store the data size of the job, wherein the control unit calculates the data size of the job using a stored data size corresponding to the job and stored in the memory unit, and executes the job if the available memory size of the external memory is larger than the stored data size of the job.

6. The image-forming apparatus as claimed in claim 5, wherein the control unit proposes at least one alternative job option having an alternate data size that is smaller than the available memory size of the external memory.

7. The image-forming apparatus as claimed in claim 5, wherein the memory unit stores the data size in a database, which includes data regarding at least one of resolution, color mode, and document type.

8. The image-forming apparatus as claimed in claim 1, wherein the external memory is a USB memory or a memory card.

9. The image-forming apparatus as claimed in claim 1, wherein the job is a job to copy data, a job to move data, or a job to scan data stored in the image-forming apparatus to the external memory.

10. A method of storing jobs in an external memory that is connectable to an image-forming apparatus, comprising:
    connecting the external memory to the image-forming apparatus;
    inputing an order to execute an operation corresponding to a selected option key when the option key is selected;
    checking a stored data size of a job stored in the image-forming apparatus according to the input order with reference to a look-up table;
    checking an available memory size of the external memory;
    comparing the stored data size to the available memory size; and
    determining whether the job can be stored in the external memory,
    wherein the stored data size is stored in the image-forming apparatus as the look-up table including a plurality of data sizes corresponding to a plurality jobs having various combinations of resolution, color mode, and document kind values.

11. The method as claimed in claim 10, wherein the determining whether the job can be stored in the external memory comprises determining whether the available memory size of the external memory is larger than the stored data size of the job.

12. The method as claimed in claim 10, further comprising proposing at least one alternative job option having an alternate data size that is smaller than the available memory size of the external memory.

13. The method as claimed in claim 12, wherein each of the proposed alternative options are displayed with corresponding option values set by the control unit.

14. The method as claimed in claim 10, wherein the external memory is a USB memory or a memory card.

15. The method as claimed in claim 10, wherein the checking the stored data size comprises determining an expected memory size of the job using the look-up table.

16. The method as claimed in claim 10, wherein the job is a job to copy data, a job to move data, or a job to scan data stored in the image-forming apparatus to the external memory.

17. A method of storing an image forming apparatus job in an external memory, the job having a combination of job options, the method comprising:
    connecting the external memory to the image-forming apparatus;
    inputing an order to execute an operation corresponding to a selected option key when the option key is selected;
    calculating a size of available memory of the external memory according to the input order;
    determining an expected size of the job using a look-up table including data sizes of a plurality of different combinations of job options;
    comparing the size of the available memory and the expected size of the job;
    when the expected size of the job is less than the size of the available memory, performing the job and updating the look-up table with an actual size of the job; and
    when the expected size of the job is greater than the size of the available memory, proposing alternative image forming apparatus jobs each having a size less than the size of the available memory.

18. The method of claim 17, further comprising:
    proposing the alternative jobs;
    selecting one of the alternative jobs;
    performing the selected alternative job; and
    updating the look-up table with an actual size of the selected alternative job.

19. The method of claim 17, further comprising:
    canceling the job; and
    storing a part of the job in the external memory.

* * * * *